United States Patent

[11] 3,628,330

| | | |
|---|---|---|
| [72] | Inventor | Robert G. Miller<br>Peoria, Ill. |
| [21] | Appl. No. | 24,458 |
| [22] | Filed | Mar. 16, 1970 |
| [45] | Patented | Dec. 21, 1971 |
| [73] | Assignee | Caterpillar Tractor Co.<br>Peoria, Ill. |

[54] SPEED-PROGRAMMED FRICTION WELDER CONTROL
8 Claims, 10 Drawing Figs.

[52] U.S. Cl. .................................................. 60/53 R,
   60/52 VS, 60/DIG. 2
[51] Int. Cl. .................................................. F15b 15/18
[50] Field of Search .......................................... 60/52 R, 52
   VS, 53 R, DIG. 2, 52 SR

[56] References Cited
UNITED STATES PATENTS

| | | | |
|---|---|---|---|
| 2,871,660 | 2/1959 | McDonald et al. .......... | 60/53 R |
| 2,939,285 | 6/1960 | Hawkins et al. .............. | 60/53 R |
| 2,977,765 | 4/1961 | Fillmore ........................ | 60/DIG. 2 |

*Primary Examiner*—Edgar W. Geoghegan
*Attorney*—Fryer, Tjensvold, Feix, Phillips & Lempio

ABSTRACT: A drive in a speed-programmed friction welder can be controlled by an electronic loop employing circuits to continuously compare the actual speed of the drive with the programmed speed throughout the weld interval and adjusting the drive so the relative rotational speeds of the parts (workpieces) being welded will decrease to zero according to a prescribed programmed pattern. Since the necessary relative rotational speeds of the workpieces may vary when welding stock of different sizes or materials, and also the weld time interval may change, a control must provide independent control of both speeds and time during the weld cycle which are features of the instant invention.

INVENTOR.
ROBERT G. MILLER

SPEED-PROGRAMMED FRICTION WELDER CONTROL

This application is a division of U.S. application Ser. No. 715,715 filed Mar. 25, 1968 (Now U.S. Pat. No. 3,542,274) issued Nov. 24, 1970.

BACKGROUND OF THE INVENTION

A speed-programmed friction welder is disclosed and discussed in the above-referenced copending application and employs a hydrostatic transmission link in its drive which is used to rotate one of the workpieces. Since a hydrostatic transmission can be infinitely varied in speed and direction below its maximum r.p.m. output, it makes an excellent link in a friction welder drive, provided a control circuit is available to adjust it continuously to the programmed speed-time profile as it changes from a high r.p.m. to zero during the interval the weld is completed.

The instant invention is designed to provide a control circuit for controlling a speed programmed weld, such as the one discussed above, so the advantages of this type of welding machine can be realized.

SUMMARY OF THE INVENTION

The control system of the present invention provides an exceptional control system for a hydrostatic transmission link in a friction welder by generating a programmed speed versus time signal, continuously comparing this signal to the instantaneous speed of the drive means and utilizing any difference between the desired speed and the instantaneous speed of the drive means to continuously adjust the speed of the drive means. A special programming circuit generates the speed versus time signal and includes adjustments so that both the time interval as well as the speed may be varied independently for fabrication of any desired speed versus time profile for the drive.

Logic circuits can be included which select independent control of either the motor or the pump and also which can be adjusted so that there is an overlap wherein both the motor and the pump are simultaneously controlled for achieving desired speeds and torques.

The error signal is summed with the signal representing the actual displacement of the pump or the motor to generate a correcting signal which prevents the system from being unstable and oscillating. Thus, a signal representing the actual displacement of the pump or the motor is fed back and summed with the error signal and the resulting correction signal is used to adjust the displacement of the pump or the motor. In the case of a zero error signal, neither the displacement of the pump or the motor will change. If the error signal indicates that the speed is too high, the displacement of the pump will be reduced or the displacement of the motor increased, while if the error signal indicates that the speed is too low, the reverse adjustment or adjustments will be made.

The sensitivity of the response of the control system is adjusted so that it is sufficiently below the instability point in the system in order that the system be stable even if both the pump and motor are simultaneously controlled.

BRIEF DESCRIPTION OF THE DRAWINGS

The above advantages and operation of this invention will be more easily understood from the following detailed description of preferred embodiments when taken in conjunction with the attached drawings in which.

Figure 1:
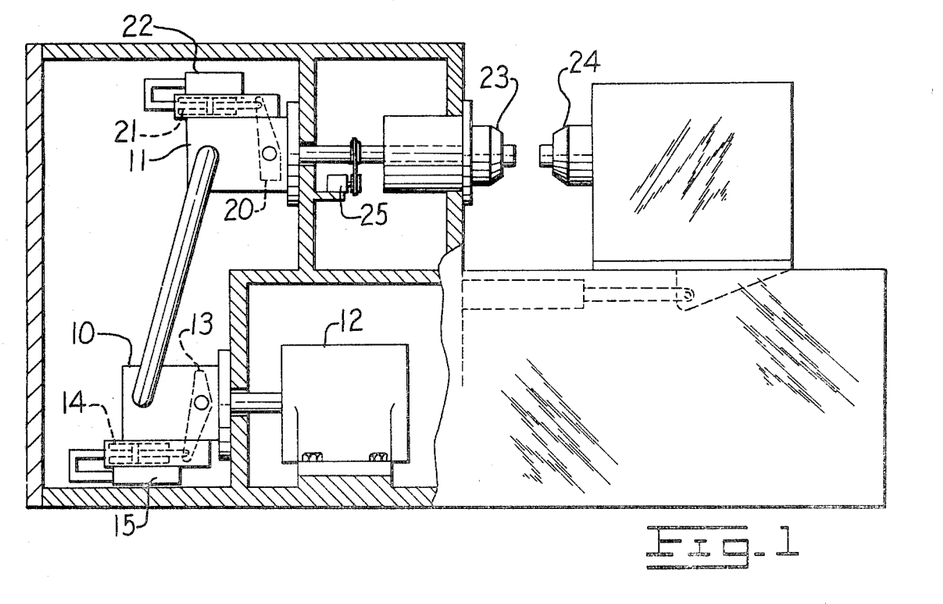
FIG. 1 is a side elevational view partly broken away to show the details and construction of a speed program welder as disclosed in the copending application.

In order to facilitate an understanding of the control system of this invention, a brief description of a speed-programmed welder is included. FIG. 1 shows an elevational view of a typical speed-programmed welder using hydraulic transmission link, which can be speed programmed with the present invention. In the transmission, a hydraulic pump 10 supplies pressurized hydraulic fluid to a hydraulic motor 11 that is coupled directly to a chuck 23. This chuck holds one workpiece and rotates it when the chuck is driven. A second workpiece is held in a stationary chuck 24 and is moved into friction contact with the rotating workpiece to generate the heat necessary to complete the friction weld. The transmission is powered by driving its pump portion with a prime mover, such as an electric motor 12.

As in a conventional hydrostatic transmission, the pump 10 includes a cam 13 through which its displacement can be adjusted by a hydraulic ram 14, which simultaneously positions a rectilinear potentiometer 15 to generate an electrical signal related to cam position. Normally in the lower speed ranges of the transmission, only the displacement of the pump is adjusted, since the maximum torque output is developed with the motor 11 at its maximum displacement. Once the pump reaches a maximum displacement, the maximum transmission output speed is achieved, unless the displacement of the motor is subsequently decreased which will increase the speed of the transmission still further, but reduce the available torque. Usually at high speeds, less torque will be needed, and using an actuating cam 20 with an associated hydraulic ram 21 to decrease the displacement of the motor is a necessary expedient to obtain higher transmission speeds, without employing a larger pump, or multiple pumps. A second rectilinear potentiometer 22 is associated with ram 21 to generate a signal related to the position of cam 20.

The operation of the above-described friction program welder is more particularly described in the above-referred copending application. Briefly, the weld is effected by placing one of the workpieces in the rotating chuck 23 while the second workpiece is placed in the stationary chuck 24. The drive is used to accelerate the workpiece in the rotating chuck to the desired initial speed at which point the stationary workpiece is moved into contact with the rotating workpiece in order to generate friction between the contiguous surfaces. This generates sufficient heat to partially melt and fuse the two workpieces which are forged together in a weld, as the relative rotation between the workpieces terminates.

Figure 2:
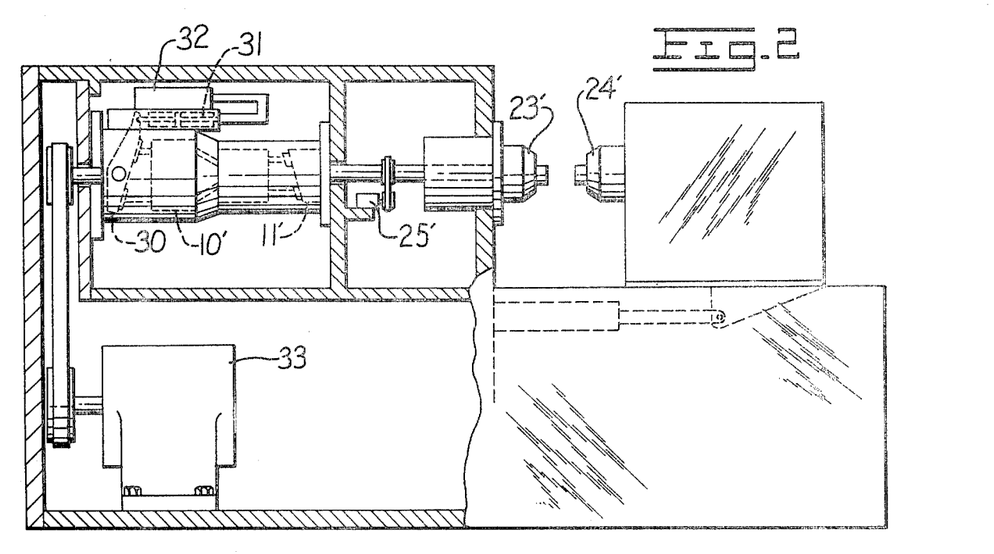
FIG. 2 is a view like FIG. 1 showing a second embodiment of the speed program welder.

FIG. 2 shows a modified form of the welder shown in FIG. 1, wherein the drive is modified by the use of a variable displacement pump in combination with a fixed displacement motor. Obviously, this type of drive means requires a pump with a much larger displacement capacity than the pump used in the drive means of FIG. 1 to get the same speed range. When using a larger displacement pump, the control system is simplified since only the displacement of the pump need be controlled. In such an embodiment, a pump 10' is provided with an actuating cam 30 for changing its displacement by the operation of a hydraulic actuator 31 which simultaneously positions a rectilinear potentiometer 32 to generate an electrical signal related to the position of the cam. The pump 10' is driven by a prime mover 33, illustrated as an electrical motor. The welding operation of the machine shown in FIG. 2 is exactly the same as that shown in FIG. 1 insofar as speeds, pressures and torques on the workpieces.

Figure 3:
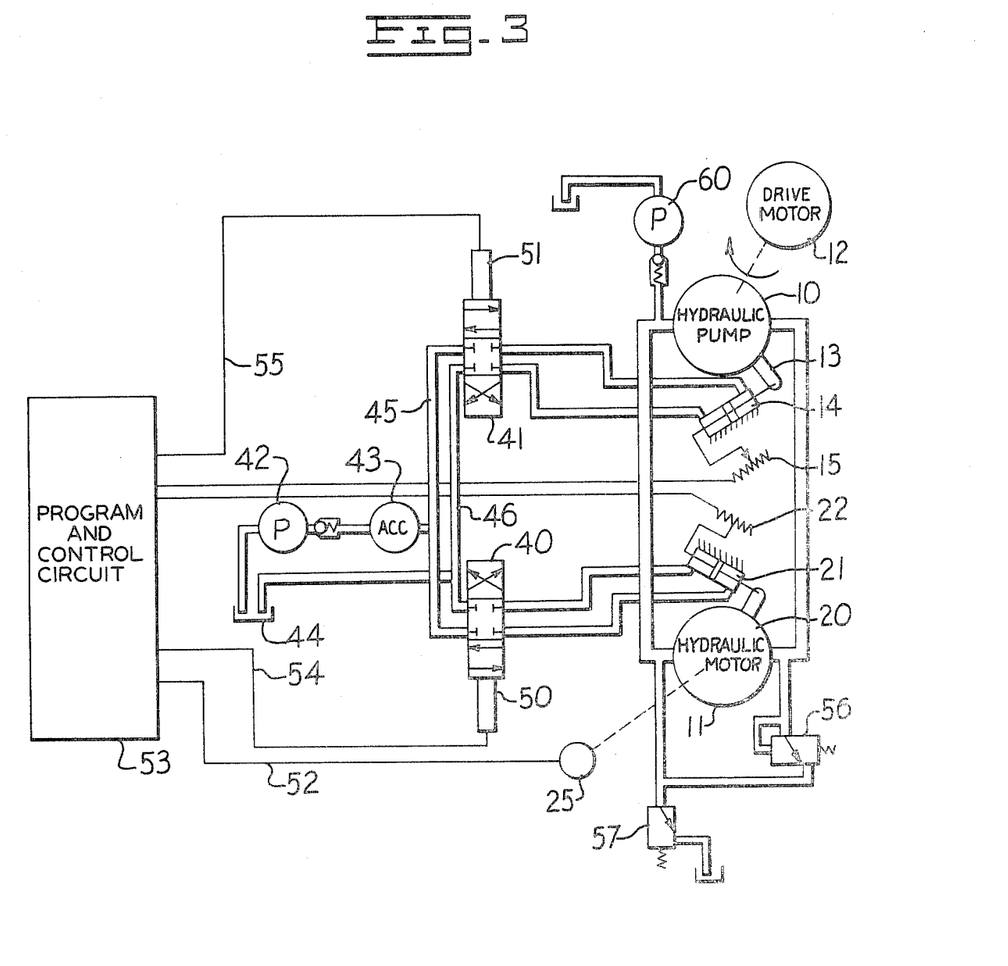
FIG. 3 is a systematic view of the hydraulic controls used in combination with the welder shown in FIG. 1.

Hydraulic controls for the drive means illustrated in FIG. 1 are shown in FIG. 3 and components of the circuit shown corresponding to those shown in FIG. 1 are identified with the same numerals. A hydraulic servo valve 41 positions hydraulic actuator 14 of the pump and a similar hydraulic servo valve 40 positions the hydraulic actuator 21 of the motor 11 of the transmission. These hydraulic servo valves are supplied with hydraulic fluid from a pump 42 from a distribution system which includes an accumulator 43. The accumulator is connected to a distribution conduit 45 coupled to both of the servo valves, and a conduit 46 drains vented hydraulic fluid from both valves to tank 44. The spool of the hydraulic servo valve 40 is actuated by an electrical solenoid 50 while a similar electrical solenoid 51 actuates the hydraulic servo valve 41. The electrical solenoid 50 is coupled by means of leads 54 to the program and control circuit 53 while the leads 55 couples the electrical solenoid 51 to this same circuit. A tachometer generator 25 by means of leads 52 provides an input to the program and control circuit where this input representing the instantaneous speed of the motor is compared with the instantaneous program speed for that particular time interval and an appropriate correction signal, if these speeds are not the same, is transmitted over the leads 54 or 55 to the electrical solenoids 50 or 51.

The transmission link system includes a conventional high-pressure relief valve 56 and a low-pressure relief valve 57 and is pressurized with a replenishment pump 60, providing makeup hydraulic fluid to the transmission loop and preventing cavitation.

Figure 4:
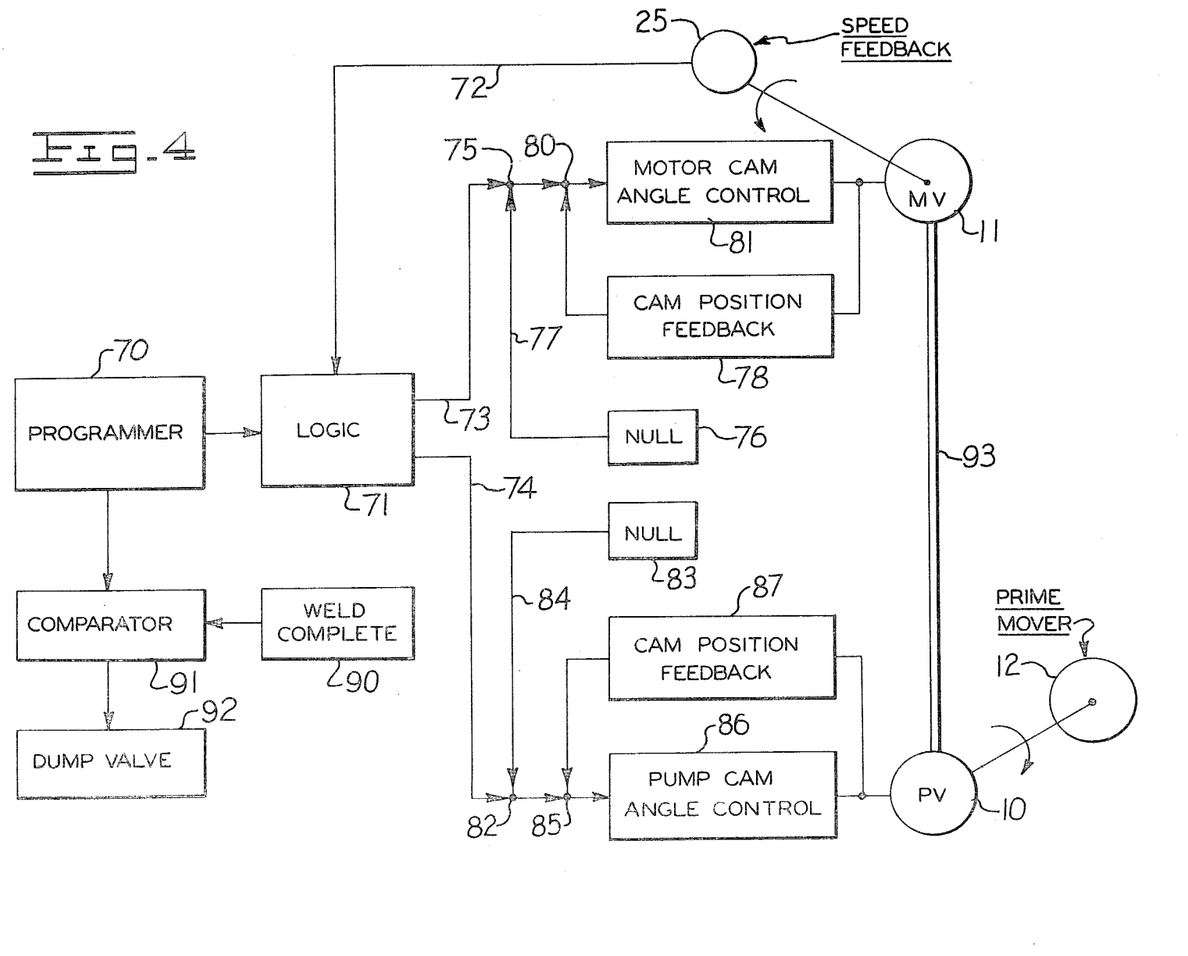
FIG. 4 is a block diagram of a control system constructed according to this invention for controlling the welder shown in FIG. 1.

Reference is now made to FIG. 4, showing a block diagram of the electrical control system constructed according to this invention, which is suitable for controlling the hydraulic drives described in the previous figures. This control system utilizes a programmer 70 that generates a speed versus time signal, which is preferably an amplitude modulated electrical signal whose amplitude is related to the programmed speed of the drive. The programmer may comprise the combination of a time-generating circuit and a function-generating circuit with the function-generating circuit modulating the signal from the time-generating circuit. The programmer could also comprise a computer using punched tape or other type of program that is read to generate the speed versus time signal.

From the programmer a speed versus time signal is supplied to a logic circuit 71 that also receives a signal over lead 72 representing the instantaneous speed of the drive motor (tachometer input). This logic circuit includes circuits for selecting the proper unit for control, i.e., the motor or the pump, while maintaining the opposite unit in a full displacement position if controlling a transmission where both units are variable displacement units. The logic circuit also compares the desired instantaneous speed of the drive motor with the actual speed of the motor to generate an error signal so the proper control signals are supplied over the leads 73 and 74 to the pump and motor control circuits.

In most of these machines, the pump is driven at a constant r.p.m. and unless otherwise stated, this should be understood in the description. As an example of the operation of the logic circuit, assume that the maximum speed of the drive is to be 3,000 r.p.m. and the capacity of the pump is insufficient to supply the necessary volume of fluid at the constant r.p.m. to obtain such a speed with the motor at its maximum displacement. Under these conditions, the pump is run at maximum displacement while the displacement of the motor is decreased to obtain greater speed. With such control of the drive link, the speed of the motor in the range between 1,500 and 3,000 r.p.m. is accomplished by varying the displacement of the motor. In the range of 0–1,500 r.p.m. the speed is controlled by varying the displacement of the pump while the motor is maintained in a maximum displacement position. The logic 71 includes suitable circuits for selecting the unit to be controlled while maintaining the other unit in a maximum displacement condition.

The signal supplied on the lead 73 is summed at a junction point 75 with a null signal from the circuit 76 that is coupled to the junction point by means of lead 77. The null signal is used to adjust or null the motor control system to obtain the proper initial or zero speed operating conditions for both units. The summed signal from the junction point 75 is supplied to a second junction point 80 where it is summed with a signal from the cam feedback circuit 78. The feedback circuit may consist of the rectilinear potentiometer that supplies a signal related to a cam angle of the motor plus any amplifiers or other circuitry, as required. If the signal supplied by the logic circuit plus the nulling signal has a positive value, then the motor cam angle controller 81 will increase the speed of the motor (decrease its displacement). Similarly, if the signal from the logic circuit plus null signal has a negative value, then the cam control will decrease the speed of the motor (increase its displacement). The cam angle controller comprises the servo actuators, hydraulic servo valves plus the hydraulic actuator that actually positions the motor cam as described above.

The signal supplied over the lead 74 is summed at a junction point 82 with a signal from a nulling circuit 83 supplied over the lead 84. The nulling circuit 83 serves to adjust or null the pump control system for the initial operating conditions. The signal from the junction point 82 is supplied to a second junction point 85 where it is summed with a cam position feedback signal from the circuit 87. The cam positioned feedback circuit 87 may comprise a rectilinear potentiometer positioned by the hydraulic actuator of the pump plus required amplifying circuits. The sum signal from the junction point 85 is then supplied to the pump cam angle controller 86 to position the cam of the pump. The pump cam angle controller positions the hydraulic servo valve that controls the hydraulic actuator of the pump control circuit.

The programmer 70 also supplies a signal to the comparing circuit 91 that compares the desired speed signal with a bias signal supplied from a weld complete circuit 90. The biasing signal would normally hold a dump valve 92 closed with the biasing signal being overridden by the programmer signal at the completion of the weld cycle to open the dump valve and shuts off the flow of hydraulic fluid to the motor by venting any pump output to the tank. The dump valve is located in the fluid connection 93 between the pump and the motor and completely shuts off the flow of hydraulic fluid from the pump. Thus, the dump valve serves to effectively prevent any creeping of the motor after the completion of the weld, since any pressurized fluid now will bypass the motor.

Figure 5:
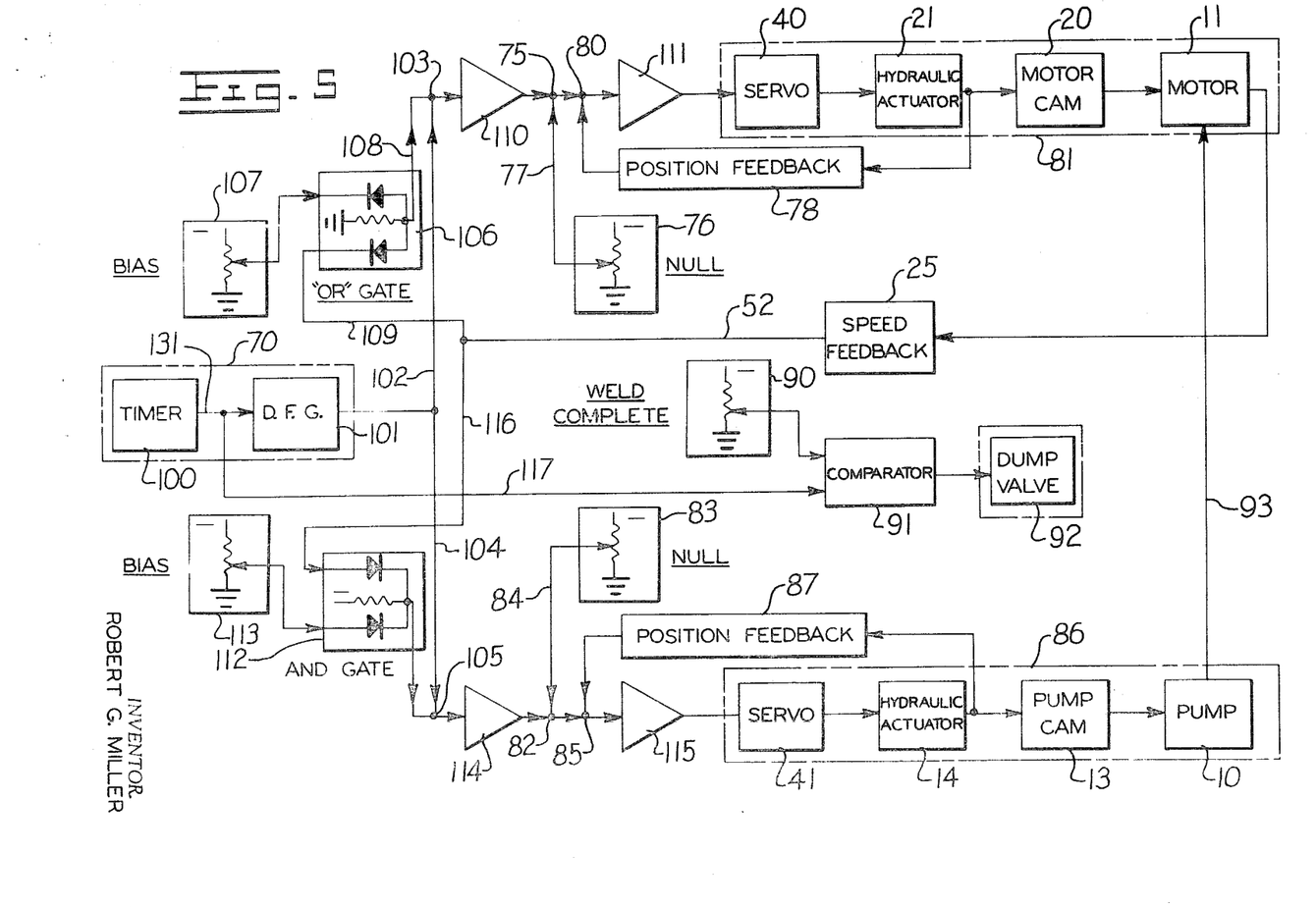
FIG. 5 is an expanded circuit diagram of the circuit shown in FIG. 4.

The construction of the control circuit is shown in more detail in FIG. 5 wherein the combined system is illustrated. For purposes of clarity, items that are the same as those shown in FIGS. 3 and 4 are indicated with the same numerals in FIG. 5. The programmer 70 comprises a time-generating circuit 100 and a diode function generator 101. The time circuit should generate a ramp voltage whose length is determined by the length of the desired time cycle and whose slope is determined by the amplitude of the signal required to operate the diode function generator. The diode function generator modulates the time signal by a plurality of straight line segments that are joined so that their sum closely approximates the desired speed versus time response profile of the motor. The diode function generator has variable break points with adjustable slopes wherein the break point is the intersection of two straight line segments comprising a portion of the composite curve. A series of slope adjustments are also incorporated in the diode function generator to control the slope of each of the straight line segments. The summation of all of the straight line segments closely approximates the desired speed versus time profile of the drive. The detailed construction of both the time-generating and the diode function-generating circuits are subsequently described below with reference to FIG. 6.

The output of the diode function generator is coupled by means of a lead 102 to a summing junction 103 that also receives a signal from an "OR"-gate 106 by means of lead 108. The "OR" gate is supplied with a first input from the tachometer generator by means of the lead 52 and 109 and a second input from a biasing source 107. The biasing source may consist of a variable resistance coupled to a suitable power supply. The "OR" gate is designed to supply the input signal having the largest amplitude to the summing junction. The signal from the summing junction 103 is amplified by an amplifier 110 and supplied to the summing junction 75. The signal from the amplifier 110 is summed with the signal from the nulling circuit 76 at the summing junction 75. The sum signal is then supplied to a summing junction 80 where the signal is summed with the signal from the feedback circuit 78. The final signal is then amplified by an amplifier 111 and supplied to the solenoid of servo valve 40 to position the hydraulic actuator 21.

The pump is controlled by a similar circuit with the diode function generator being coupled by a lead 104 to a summing junction 105 that also receives a signal from an "AND"-gate 112. The "AND" gate compares an input signal received from the tachometer generator by means of the leads 52 and 116 with an input signal from the biasing circuit 113 and supplies the summing junction 105 with the smaller of the two signals. The summing junction 105 is coupled to an amplifier 114 that supplies its output to a summing junction 82 where it is summed with the signal received from the nulling circuit 83. The sum signal is then supplied to a summing junction 85 where it is summed with a position feedback signal from the circuit 87. The final sum of the signals is supplied to a servo amplifier 115 whose output positions the solenoid of servo valve 41 to control the hydraulic actuator 14.

The timer circuit 100 is also coupled by means of a lead 117 to the comparing circuit 91 described above.

From the above description of the control circuit, it can be appreciated that the motor may be used to control the speed of the drive in the high-speed range, such as between 1,500 and 3,000 r.p.m., while the pump may be used to control the speed of the drive in the low-speed range, such as between 0 and 1,500 r.p.m. This result is achieved by using the "OR"-gate 106 to supply the larger of its two input signals to the motor control circuit, one being the biasing signal 107 and the other being the signal from the tachometer generator, so that the latter will control the motor whenever it exceeds the amplitude of the biasing signal. In a similar manner, changes in the pump displacement controls the speed in the low range since the "AND" gate transmits the smaller of two signals from the tachometer generator and a bias. Thus, by designing this circuit so that the pump cam is positioned at its maximum position in response to the biasing signal 113, when the signal from the tachometer generator falls below the biasing level, it will be passed by the "AND" gate and used to control the pump control circuits. The pump control circuits should be designed so that when the signal level from the "AND" gate falls below the biasing level, it will tend to reduce the cam angle of the pump from its maximum position.

Also, as explained above, the weld complete circuit operates by utilizing the time signal and comparing it with a biasing signal from a weld complete circuit 90. Thus, the comparator should be designed to pass the biasing signal to the dump valve to hold it in a closed position until the amplitude of the timer signal exceeds the biasing level, at which time it will dump or vent to the tank. Thus, the biasing level should be set at approximately the maximum output level of the time circuit. This will insure that the dump valve remains closed until the end of the operating cycle, at which time it is opened to dump any flow of pressurized fluid to the motor or to the tank.

Figure 6:
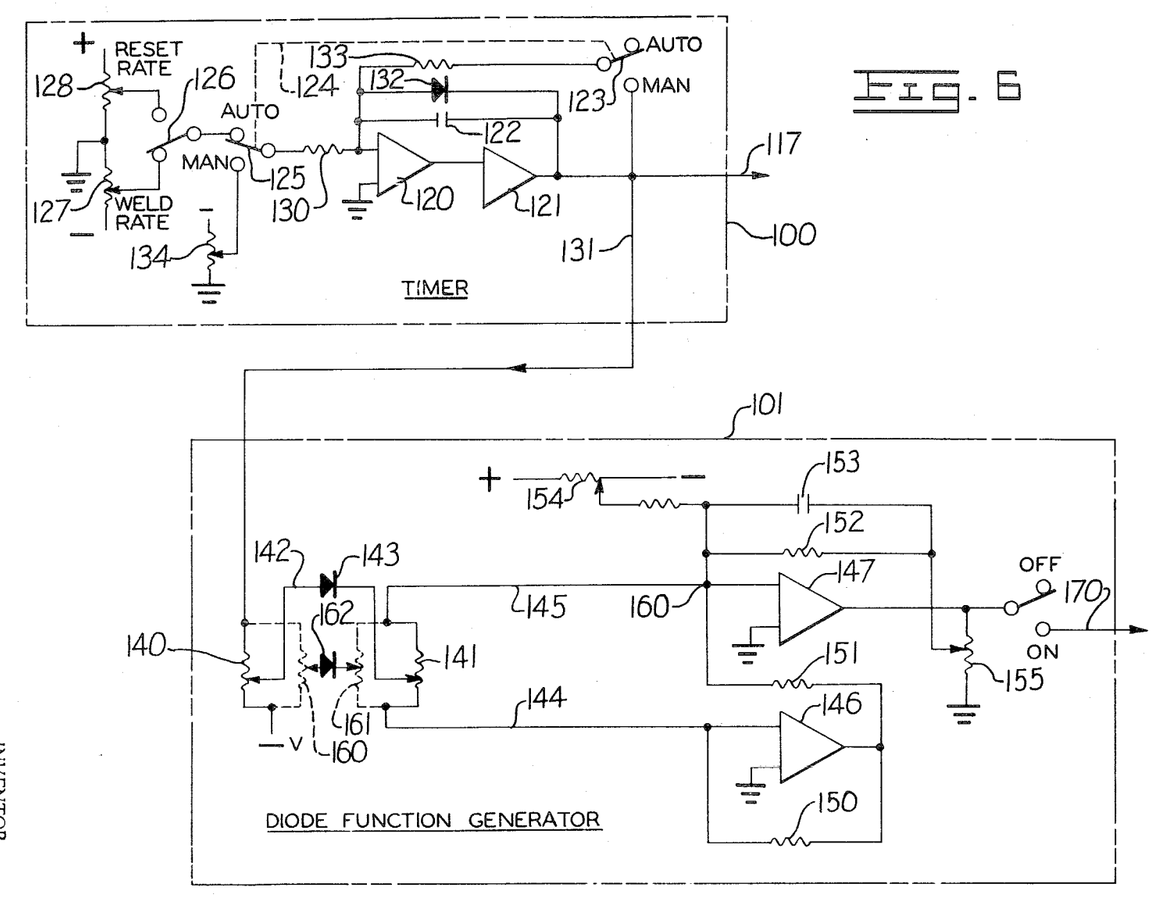
FIG. 6 is a circuit diagram of the timer and function generator of the programmer shown in FIG. 4.

Referring now to FIG. 6 there is shown the detailed circuit diagrams of the timer and the diode function generator. More particularly, the time circuit comprises two amplifiers 120 and 121 that are provided with a capacitor 122 in their feedback circuits and an input resistance 130 so that they will operate as an integrating circuit. Two switches 123 and 125 are ganged together by means of a link 124 and used to place the timing circuit either in an automatic operation (auto) or in a manual operation (man) as noted in the drawing. An additional two-position switch 126 is provided for coupling the time circuit either to a welding rate potentiometer 127 or to a reset potentiometer 128. It should be noted that the welding rate potentiometer supplies a negative potential to the integrating circuit while the reset potentiometer supplies a positive signal to the circuit. A feedback path of the amplifier is also provided with a diode 132 that shorts the amplifiers if the output should attempt to assume a negative value. These amplifiers are also provided with a resistance 133 which may be coupled in their feedback circuit by means of the switch 123 so that the amplifiers will operate as a summing circuit when the timing circuit is placed in a manual (man) operating position. When the timing circuit is in a manual operating position, its output will be determined by the position of the wiper on the manual control potentiometer 134 which is coupled to the input circuit of the amplifiers by means of the switch 125.

The timing circuit operates by integrating the signal that appears at the input of the amplifier 120. The slope of integration, and thus the slope of the output signal, will be determined by the magnitude of this input signal which in turn is determined by the setting of a weld rate potentiometer 127. The maximum amplitude of the output signal will be determined by the saturation level of the two amplifiers 120 and 121. Thus, the length of the time cycle can be controlled by varying the amplitude of the input signals to the amplifier as by adjusting the setting of the weld rate potentiometer. The above description of the output of the time circuit can be more easily understood from the following formulas:

Summing the currents at the input of the amplifiers yields $$\frac{E_1}{R_{130}} = -C_{122}\frac{dE_Q}{dt} \text{ or } \frac{dE_Q}{dt} = -\frac{E_1}{R_{130}C_{122}}$$

Integrating and assuming that $E_1$ is a constant $$E_o = -\frac{E_1}{R_{130}C_{122}}t$$

If $E_i$ is positive the slope is negative, while if it is negative the slope is positive, thus with a negative input voltage the output voltage $E_o$ is positive.

At the conclusion of a time cycle the amplifiers will remain in a saturated condition and must be reset to an initial condition by positioning the reset switch 126 so that a positive voltage is applied to the input of the amplifier. This positive voltage will then cause the output of the amplifiers to decrease in amplitude to zero. The output of the amplifiers will be prevented from assuming a negative value by the diode 132 that shorts any negative signals directly back to the input of the amplifiers. Thus, the reset circuit will return the amplifiers to a zero output voltage and the time circuit can then generate a new timing cycle.

When the switches 123 and 125 are placed in a manual (man) position, the resistance 133 will connect the amplifiers so that they operate as a summing circuit with a gain of one t sum whatever voltage appears at the input of the amplifiers with the previous voltage. Thus, the output of the amplifier will be determined by setting of the manual potentiometer 134. The manual circuit can be used to adjust the diode function generator as explained below.

The diode function generator consists of a plurality of parallel connected breakpoint potentiometers 140 and slope potentiometers 141. The wipers of the two potentiometers are coupled together by means of a lead 142 having a diode 143 disposed therein. The diode 143 will conduct whenever the signal from the time circuit plus the voltage from the potentiometer 140 exceeds its breakdown level.

A breakpoint is the intersection between two line segments comprising a portion of the stepped output voltage of the diode function generator. The adjustment of the potentiometer 140 for a particular signal on lead 131 will cause the diode 143 to conduct and determine the breakpoint. This will produce a voltage whose slope is controlled by the adjustment of the slope potentiometer 141 and can be either negative or positive. A separate break and slope potentiometer is required for each segment of the fabricated voltage curve. The number of segments used will depend on the complexity of the desired voltage curve and how closely the curve must be fitted. All of the breakpoint and slope potentiometers are disposed in a parallel arrangement as shown by the dotted potentiometers 160 and 161 and diode 162.

A resistance 141 is coupled by means of a lead 144 to the input of an amplifier 146 and by lead 145 to the input of an amplifier 147. Amplifier 146 is provided with a feedback resistance 150 and has its output coupled to the input of the amplifier 147 through resistance 151. Amplifier 147 also includes a resistance 152 and a capacitor 153 connected in parallel in its feedback circuit. The combination of the slope resistance 141 and the amplifier 146 and 147 form a circuit by means of which the slope of the output signal may be adjusted either positive or negative. More particularly, the slope of the output signal will be determined by the feedback resistance 150 of the amplifier 146 and the slope potentiometer 141.

The output voltage of amplifier 146 is $$e_{146} = \frac{R_{150} \times e_{144}}{(1-a)R_{141}}$$

where $e_{144}$ in the voltage on lead 144 and $a$ in the position from one end of the wiper of potentiometer 141.

$$e_{147} = e_{0146}\frac{R_{152}}{R_{151}} - e_{144}\frac{R_{152}}{aR_{141}} = \frac{R_{152}R_{150}e_{144}}{R_{151}(1-a)R_{141}}$$

$$- \frac{R_{152}e_{144}}{aR_{141}} = \frac{R_{152}R_{150}}{R_{151}(1-a)R_{141}} - \frac{R_{152}}{aR_{141}}e_{141}$$

The slope $$\frac{e_{147}}{e_{144}} = \left[\frac{R_{150}}{(1-a)R_{151}} - \frac{1}{a}\right]\frac{R_{152}}{R_{141}}$$

The slope will be positive when $$\frac{R_{150}}{(1-a)R_{151}}$$

is greater than 1/a and negative when it is less than 1/a. Thus, the slope can be set by adjusting the wiper on the slope potentiometer 141.

The output of the diode function generator is determined by the sum of the voltages appearing at the junction point 160. Of course, the sum of the voltages appearing at the point 160 is determined by the output from the timing circuit and the settings of the various break point and slope potentiometers. Thus, the diode function generator output will be a continuous voltage that can be properly sealed to represent the desired speed versus time of the variable speed drive means.

The potentiometer 154 and its power supply (not shown) is provided for furnishing an initial speed signal to the amplifier 147. Similarly, the potentiometer 155 is provided for adjusting the gain of the diode function generator to insure that a proper signal level is supplied to the remainder of the control system.

Figure 7:
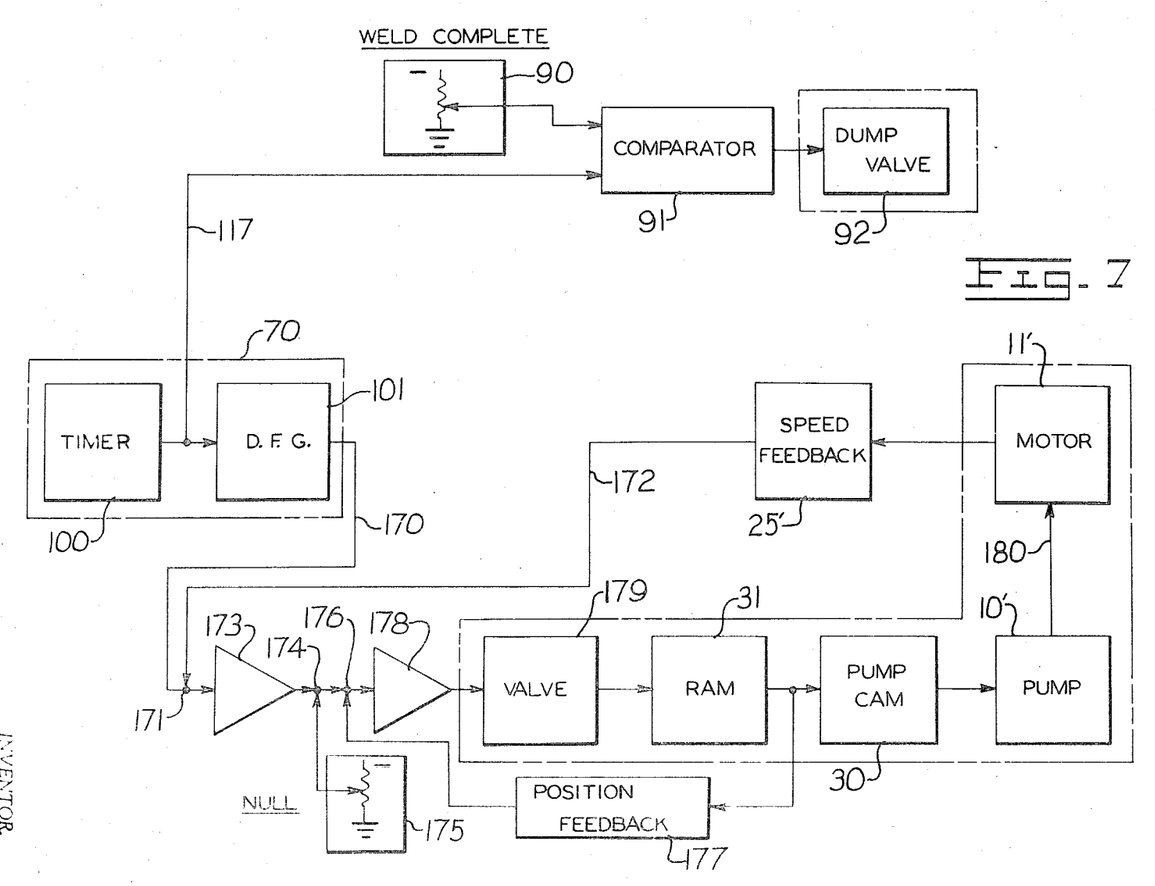
FIG. 7 is a block diagram for use with a second embodiment of the speed program welder shown in FIG. 2.

Referring now to FIG. 7, there is shown a modified control system for use with a pump and motor combination wherein the pump has sufficient capacity to drive the motor for the highest drive speed. In this type of system, it is only necessary to provide a control for varying the displacement of the pump. This system utilizes some elements that are identical to the one described with reference to the previous system. For example, the weld complete circuit is exactly the same and the dump valve 92 opens the fluid connection 180 between the pump 10' and the motor 11' in the same manner as described above so any pressurized fluid will be dumped to reservoir. Similarly, the time circuit 100 and the diode function generator 101 are identical to those described above.

The diode function generator is coupled to only one control circuit by means of a lead 170 to its summing junction 171 which also receives a signal from the tachometer generator 25' over lead 172. Thus, the summing junction compares the actual speed of the motor with its programmed speed and supplies a signal representing any difference to an amplifier 173. The output of the amplifier 173 is supplied to a summing junction 174 where its output is summed with a signal from a nulling circuit 175 to provide an error signal. As explained above, the nulling circuit is used to provide an initial null or zero speed condition for the control circuit. The output from the summing junction 174 supplied to a summing junction 176 where the error signal is summed with a position feedback circuit from a circuit 177, which includes a rectilinear potentiometer 32, like shown in FIG. 2. Thus, the summing junction 176 will supply a signal to the servo amplifier 178 which is the algebraic sum of the error signal plus the present position of the hydraulic actuator. The output signal from the servo amplifier 178 is supplied to the solenoid of a servo valve 179 which in turn positions the hydraulic actuator accordingly.

OPERATION

The above control system operates by generating a control signal whose amplitude at any particular time is proportional to a preselected speed of the drive for that instant, which is automatically compared with a signal representing the actual speed of the drive means in the summing junctions shown in FIGS. 5 and 7. If the actual speed equals the desired speed, the output from the summing junction will be a zero signal. Any signal from the first summing junction is supplied to a second summing junction where it is summed with a null biasing signal to generate an error signal. This error signal is algebraically summed with a signal that represents the present position of the control cams of the pump or the motor and an adjustment will move the control cam to cancel the error signal. If the error signal indicates that the speed should be reduced, it will be summed with the feedback signal to effect this correction. In a similar manner, if the speed is too great, the error signal will be summed with the feedback signal to reduce the speed.

Figure 8:
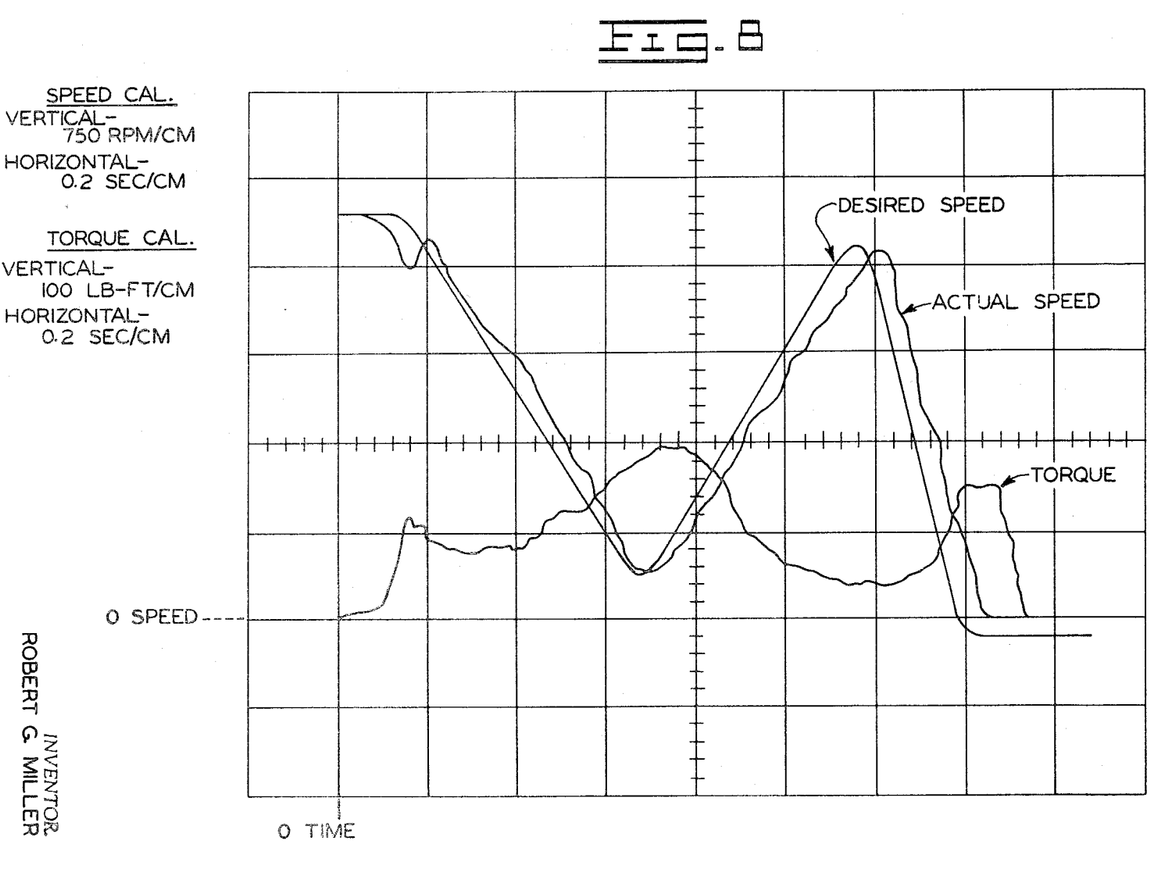
FIG. 8 illustrates a comparison of the actual speed of the drive means versus the desired speed of the drive means.
Figure 9A:
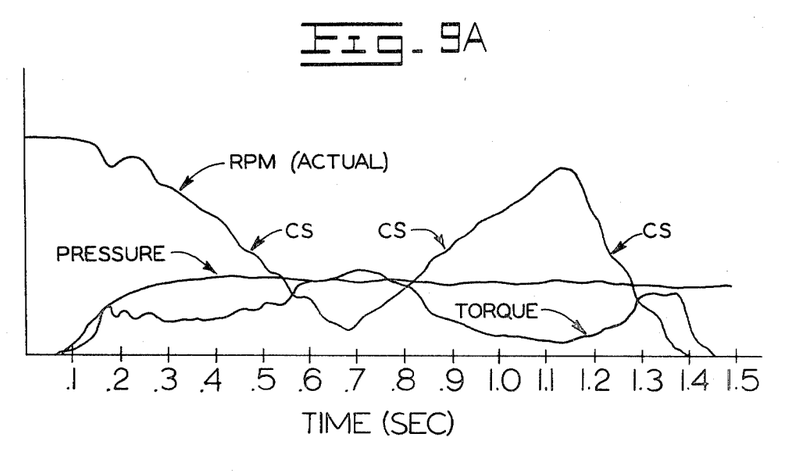
FIGS. 9A and 9B show a comparison of the desired speed and actual speed of the drive means while welding representative materials.
Figure 9B:
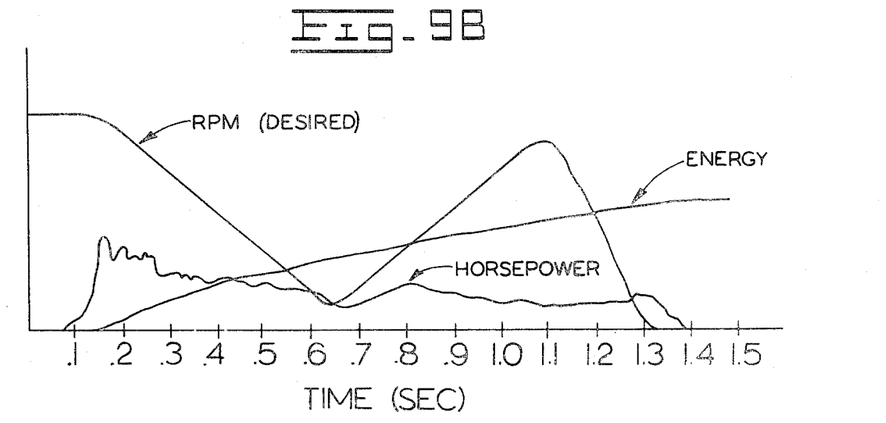

FIGS. 8 and 9 show the actual traces effected with the above speed control circuit when used to control a hydrostatic drive on a friction welding device. FIG. 8 shows several curves; one being the desired speed and the other being the actual speed over a predetermined time interval. Similarly, FIG. 9A indicates the actual desired r.p.m. of the drive means while FIG. 9B indicates the desired r.p.m. of the drive means. Again it can be seen that the actual r.p.m. of the drive means closely approximates the desired r.p.m. of the drive means.

What is claimed is:

1. A programmable control system for variable-speed drive means which include a hydrostatic transmission with a variable displacement hydraulic pump and a hydraulic motor comprising:

circuit means producing a changeable amplitude versus-time signal according to a preselected speed-time program;

transducer means driven by said hydraulic motor and generating a speed signal proportional to the actual speed of said motor;

logic circuit means connected to receive as inputs said amplitude-versus-time signal from said circuit means and said speed signal from said transducer means and operable to give an output error signal proportional to the difference between said input signals; and actuator means connected to said variable displacement hydraulic pump to change its displacement and also connected to receive said output error signal, said actuator means changing the displacement of said pump in response to said error signal.

2. The programmable control system as described in claim 1 wherein a dump valve is included between the hydraulic pump and motor and a comparator means is connected to the logic circuit means and said dump valve, whereby said dump valve will vent any fluid flow from said pump to said motor when said logic means require zero speed from said motor to avoid creep in said motor.

3. The programmable control system as described in claim 2 wherein both the hydraulic pump and the hydraulic motor are variable displacement units, a motor actuator means is connected to said variable displacement motor, said motor actuator means is connected to logic circuit means and said logic circuit means includes "OR" and "AND" gates whereby pump displacement will be varied for low-speed ranges and motor displacement will be decreased for higher speed ranges, with the uncontrolled unit always at its maximum displacement.

4. The programmable control circuit described in claim 2 wherein the circuit means includes a variable timing generator connected to a function generator whereby said logic circuit will receive a time-based variable amplitude signal representing the preselected speed-time program.

5. The programmable control circuit as described in claim 4 wherein the timing generator produces a linear increasing voltage proportional to the amplitude of its voltage input and the function generator includes means for generating a plurality of straight-line functions, the sum of which approximates the preselected speed-time program.

6. The programmable control circuit as described in claim 5 wherein the hydraulic motor is a variable displacement unit and includes actuating means connected to it for varying its displacement in response to an error signal from the logic circuit means above a predetermined amplitude.

7. The programmable control circuit as described in claim 5 wherein the timing generator includes a manual position in which the voltage amplitude of the time signal can be advanced manually and the function generator includes adjustable means to vary the length and slope of its straight-line functions whereby any selected speed-time profile can be fabricated.

8. The programmable control circuit as defined in claim 7 wherein the function generator is a diode function generator.

* * * * *